J. C. MURDOCK.
SHOCK ABSORBER FOR AUTOMOBILES.
APPLICATION FILED OCT. 10, 1908.
912,483.
Patented Feb. 16, 1909.
2 SHEETS—SHEET 1.
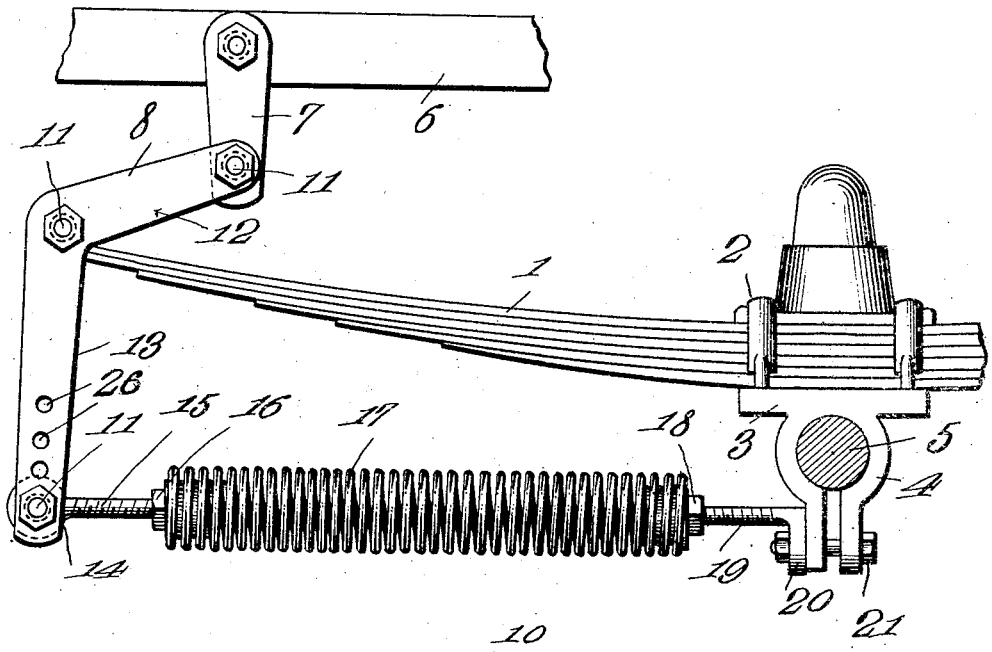
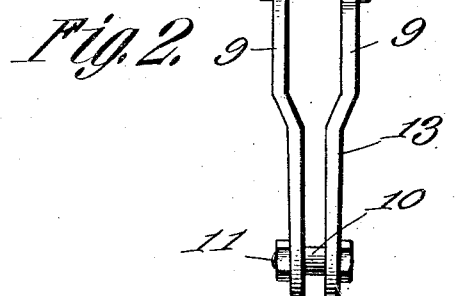
John C. Murdock
Inventor
Witnesses

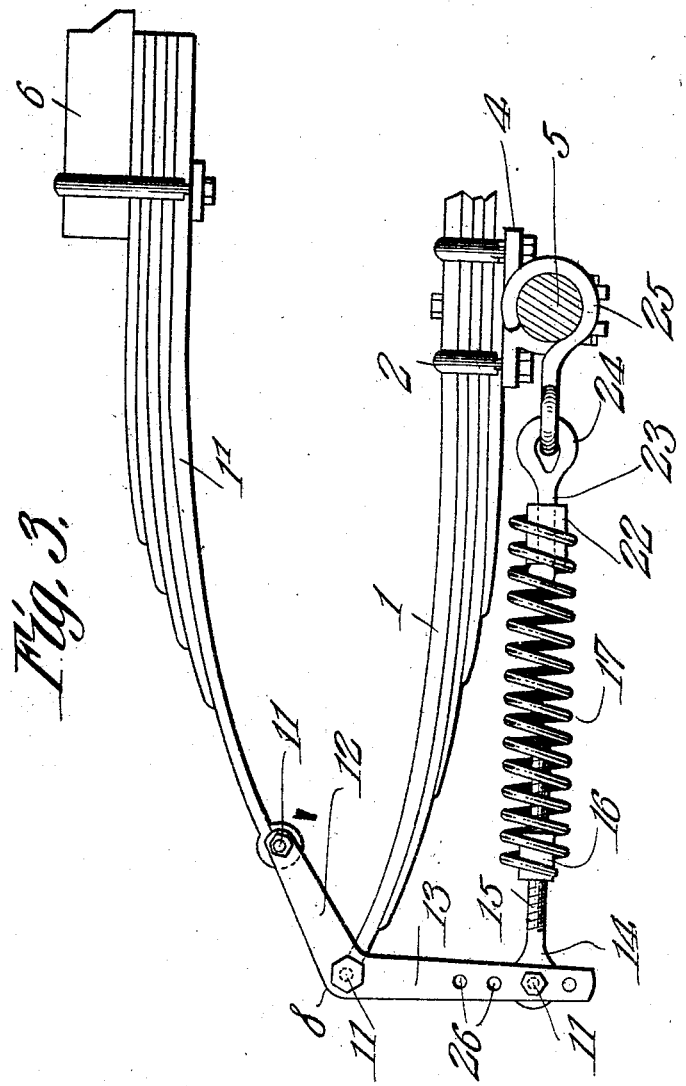

UNITED STATES PATENT OFFICE.

JOHN COUCH MURDOCK, OF BRODHEAD, WISCONSIN.

SHOCK-ABSORBER FOR AUTOMOBILES.

No. 912,483.

Specification of Letters Patent.

Patented Feb. 16, 1909.

Application filed October 10, 1908. Serial No. 457,145.

*To all whom it may concern:*

Be it known that I, JOHN C. MURDOCK, a citizen of the United States, residing at Brodhead, in the county of Green and State of Wisconsin, have invented a new and useful Shock-Absorber for Automobiles, of which the following is a specification.

This invention has reference to improvements in shock absorbers for automobiles and it is designed to produce an attachment auxiliary to the ordinary springs of an automobile for adjusting them to different loads and conditions of roads.

While the springs provided with an automobile or other like structure have their elasticity adjusted to average conditions, they will not respond properly to extra rough conditions of road or extra heavy load, or they may be so heavy as not to absorb shocks when the load is light.

With the present invention provision is made for supplementing the ordinary automobile springs with another spring or springs so arranged as to render the spring support as a whole more elastic, while at the same time provision is made whereby the tension of the springs may be adjusted to either the load or the road conditions or both at will.

With the present invention the body of the vehicle may be so supported and the springs so adjusted as to ride easily and evenly with a heavy passenger on one side and a light passenger on the other side, or if the road conditions be bad then the springs may be adjusted accordingly. Moreover these adjustments may be readily made either on the road or on starting a journey without any necessary exercise of skill and with the tools usually found in the repair kit of an automobile, or by hand.

The invention will be best understood from a consideration of the following detail description taken in connection with the accompanying drawings forming a part of this specification, with the understanding however that the showing of the drawings is not to be taken as more than illustrative of the invention since the invention is applicable to a great number of types of road vehicles and in order to adapt the invention to distinct types of road vehicles it is necessary that the forms and sizes and even the locations of some of the parts shall be modified in accordance with the type of vehicle. This however may be done without in any manner departing from the spirit of the invention or sacrificing any of the advantages thereof.

In the drawings, Figure 1 is a side elevation with parts in section showing the application of the supplemental spring structure to one end of one of the body supporting springs of an automobile or other road vehicle. Fig. 2 is an elevation of a portion of the structure shown in Fig. 1. Fig. 3 is a side elevation showing the application of the invention to a different type of spring than shown in Fig. 1.

While the purpose of the present invention is to render the running of an automobile easier under different conditions of load and road than heretofore, it is to be understood that other road vehicles may be equipped with the invention with like results whether such road vehicles be of the self-moving type or whether they be drawn by animals.

In the drawing there is shown a spring 1 of the ordinary laminated leaf spring type, usually elliptical in shape. In the particular form shown in the drawings the spring is held by clips 2 to a plate 3 which in turn is formed with a clip 4 embracing the axle 5 of the vehicle. This structure is of known type and may be varied as may be desired in accordance with the type of vehicle to which the spring is applied, and the spring itself may be differently shaped than shown in the drawing, this portion of the drawing being simply illustrative. There is also shown in the drawing a portion 6 of the frame work carrying the body of the vehicle although the body is not shown in the drawing, but it will be understood that this part of the vehicle is of known construction and will be varied in accordance with the type of vehicle.

Fast to the body 6 or frame 6 as the case may be is a depending bracket 7, in the form shown in Fig. 1, to which is pivotally secured one end of an angle arm 8 made up as shown in Fig. 2 of two like members 9 spaced apart by sleeves 10 upon bolts 11 which serve to hold the two members 9 in proper relation one to the other. This angle arm may be termed the evener.

The evener 8 is made up in the particular instance shown of a short arm 12 and a longer arm 13 and at the junction of these two arms or at the angle one of the bolts 11 is passed through the two members 9 and serves as a pivot for the corresponding end of the spring 1. The free end of the arm 12 is secured to the bracket 7 by another of the bolts 11 and through the free end of the arm 13 there is passed another bolt 11, the two members 9 approaching each other toward the free end of the arm 13 so that the evener 8 is not as wide at the end of the arm 13 as at the end of the arm 12.

Surrounding the sleeve 10 at the free end of the arm 13 is an eye 14 formed on one end of a threaded rod 15 the other end of which receives an internally threaded block 16 shaped to receive the corresponding end of a helical spring 17, the structure being such that the block may be turned upon the rod or stem 15. At the other end of the spring 17 is another internally threaded block 18 upon a threaded rod 19, the other end of which terminates in a head 20 adapted to be secured to the yoke 4 by the bolt 21.

The rods 15 and 19 are threaded in opposite directions, that is one rod has a right hand thread and the other rod a left hand thread so that on turning the blocks 16 and 18 the spring may be extended or contracted by the simultaneous screwing of the block on to the rods or in a direction toward the free ends thereof.

It will be observed that the body 6 is no longer supported upon the spring 1 as is customary but is supported through the bracket 7 and arm 12 upon the spring 1 while the arm 13 is connected to the axle or other fixed structure through the spring 17.

In Fig. 3, a spring member 1' is secured to the body or body frame 6, this spring member being like the spring 1. The free or outer end of the spring 1' is secured directly to the free end of the arm 12 of the evener.

In the structure shown in Fig. 3, the spring 17 is connected, as in Fig. 1, by a block 16 and threaded rod 15 to the arm 13 of the evener 8, while at the other end of the spring 17, there is a block 22 in which there is secured a swivel rod 23 terminating in an eye 24 to which latter there is secured a hook 25 shaped to embrace the axle 5.

The arm 13 of the evener 8, may have a series of perforations 26 so that the effective length of the arm may be regulated.

If a weight be placed upon the body 6 and the ordinary and supplemental springs be properly tensioned then they will yield simultaneously but because of the leverage of the evener the yielding of the springs will be greater than would be the case if the body were connected directly to the end of the spring 1 or 1 and 1' and consequently on rough or uneven roads the body of the vehicle is comparatively undisturbed.

If the spring 17 be made quite stiff by screwing the nut 16 or the nuts 16 and 18 upon the respective rod 15 or rods 15 and 19 then the elasticity of the springs will be due to the greatest extent to the yielding of the spring 1 or 1 and 1'. This will be the case when a heavy load is to be supported and the spring 17 will assist the spring 1 or 1 and 1' in sustaining the load and adding stiffness to the springs.

In case of a light load the spring 17 may be made of less tension so that it will support and yield to the load where the spring 1 or 1 and 1' is too stiff therefor.

For rough roads and for light or heavy loads the spring 17 will be strengthened or weakened as the case may be and in accordance with the conditions present.

The attachment is designed to be used in connection with existing structures without any material change thereof, it being only necessary to loosen the end of the spring 1 from its normal engagement with the carriage body or frame supporting the same and to attach the bracket 7 to the frame 6 with the spring 1 attached to the angle of the arm 8 and the spring 17 attached to the yoke 4 in the structure of Fig. 1, or to disconnect the two members 1 and 1' and properly adjust them and then make the connections as shown. The supplemental springs 17 may be attached to either or both ends of any or all the springs supporting the body. The spring 17 may be readily turned on its longitudinal axis to cause the nuts 16 and 18 to screw simultaneously upon the rods 15 and 19 because of the opposite direction of the threads thereon or to unscrew therefrom as the case may be and as desired and by this means the structure of Fig. 1 may be quickly adjusted to unequal loading of the vehicle. In the structure of Fig. 2 the spring 17 may be readily turned by hand and adjusted as to tension.

Sometimes the passenger on one side of the body will be a heavy person and on the other side a light person so that unequal loads are brought upon the springs. In this case one spring 17 will be adjusted for the heavy person and the other spring 17 for the light person so that the load upon the springs is thereby equalized. This will result in a very much easier running of the vehicle than is the case with the ordinary springs or with supplemental springs which are not adjustable for the different distributions of the load. Furthermore the body is maintained level, even when the load is unequally distributed, thus, in the case of an automobile, having a chain drive, keeping the chain and sprocket wheels in such alinement as to greatly reduce liability of the chain running off.

Where the attachment is installed in a new vehicle the connections will be modified acordingly but the adjustable spring 17 and the arm 8 with its intermediate connection to the spring 1 will be retained.

In referring to the part 6 as the vehicle body an the bracket 7 as attached to the vehicle body it will be understood that the results are the same whether the bracket 7 be attached directly to the vehicle body or to some of the irons supporting the same.

What is claimed is:

1. An attachment for vehicles comprising a spring, a lever attachable at one end to the vehicle body and at an intermediate point to a respective one of the ordinary springs carried by the running gear of the vehicle, and connections between one end of the first named spring and the lever and other connections between the other end of the first named spring and a portion of the running gear of the vehicle.

2. An attachment for vehicles comprising a spring, a lever attachable at one end to the vehicle body and at an intermediate point to a respective one of the ordinary vehicle springs carried by the running gear of the vehicle, and adjustable connections between the first named spring and the lever, and other connections between said first named spring and the portion of the running gear of the vehicle carrying the ordinary vehicle springs.

3. An attachment for vehicles comprising a spring, a lever attachable at one end to the vehicle body and at an intermediate point to a respective one of the ordinary vehicle springs carried by the running gear of the vehicle, and an adjustable connection between the first named spring and the lever at the end thereof remote from its connection to the vehicle body and other connections between the other end of the first named spring and a portion of the running gear of the vehicle.

4. An attachment for vehicles comprising a spring, a lever attachable at one end to the vehicle body and at an intermediate point to a respective one of the ordinary vehicle springs carried by the running gear of the vehicle, screw connections between one end of the first named spring and the lever and a swivel connection between the other end of the first named spring and a portion of the running gear of the vehicle respectively.

5. An attachment for vehicles comprising a spring, an angle lever attachable at one end to the vehicle body and at an intermediate point to a respective one of the ordinary vehicle springs carried by the running gear of the vehicle, a screw connection between the other end of the angle lever and the first named spring and adjustable to and from the intermediate point of said lever, and a swivel connection between the other end of the first named spring and a portion of the running gear of the vehicle.

6. An attachment for vehicles comprising an extension spring, a nut connected to one end of said spring, a swivel hook for engaging a fixed portion of the running gear of the vehicle, an angle lever having a short arm for connection to the body of the vehicle at its free end and adapted at the angle to be connected to one of the ordinary springs carried by the running gear of the vehicle and a screw rod connected to the free end of the longer arm of the lever and entering the nut at the respective end of the first named spring.

7. An attachment for vehicles comprising a spring, connections between the said spring and the vehicle body and including means for attachment to one end of one of the ordinary vehicle springs carried by the running gear of the vehicle, and connections between the first named spring and the running gear of the vehicle.

8. An attachment for vehicles comprising a spring supplemental to an ordinary vehicle spring carried by the running gear of the vehicle, connections between one end of the supplemental spring and the vehicle body and including means for attachment to one end of the vehicle spring, and connections between the other end of the supplemental spring and the running gear of the vehicle, the connections with the supplemental springs being adjustable to regulate the tension of said spring.

9. An attachment for vehicles, comprising a spring supplemental to an ordinary vehicle spring and having one end connected to the same member of the vehicle to which the ordinary spring is attached, and a lever connected on one end to the supplemental spring, at an intermediate point to the ordinary vehicle spring, and at the other end to a member of the vehicle otherwise unconnected to the said ordinary vehicle spring.

10. An attachment for vehicles, comprising a spring supplemental to an ordinary vehicle spring in fixed relation to the running gear of a vehicle, and having one end connected to the said running gear, and a lever connected at one end to the supplemental spring, at an intermediate point to the ordinary vehicle spring, and at the other end to the vehicle body which latter is otherwise unconnected with the said ordinary vehicle spring.

11. An attachment for vehicles, comprising a spring supplemental to an ordinary vehicle spring, the latter being fixed to one of the vehicle axles and the supplemental spring having one end also connected to the vehicle axle, and a lever connected at one end to the supplemental spring, at an intermediate point to the ordinary vehicle spring, and at the other end to the vehicle body which latter is otherwise unconnected with the said ordinary vehicle spring.

In testimony that I claim the foregoing as my own, I have hereto affixed my signature in the presence of two witnesses.

JOHN COUCH MURDOCK.

Witnesses:
W. H. FLEEK,
EDW. H. COLE.